G. L. CHITWOOD.
WAGON JACK.
APPLICATION FILED MAR. 14, 1913.
1,078,610.
Patented Nov. 18, 1913.
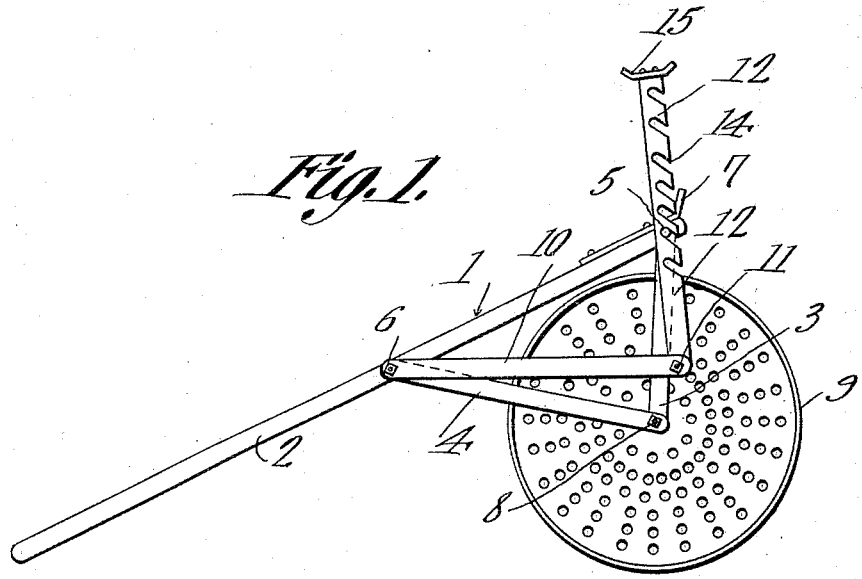
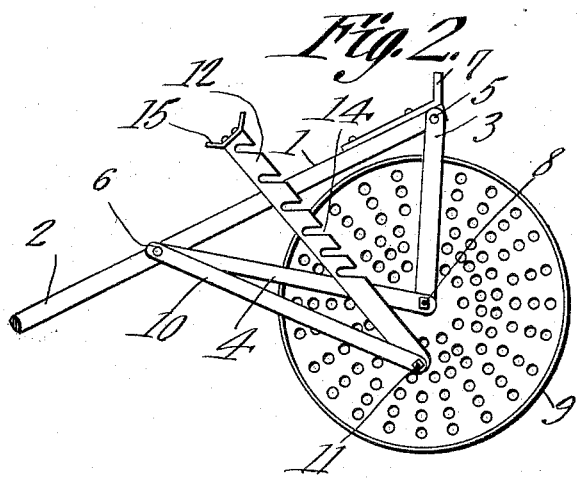
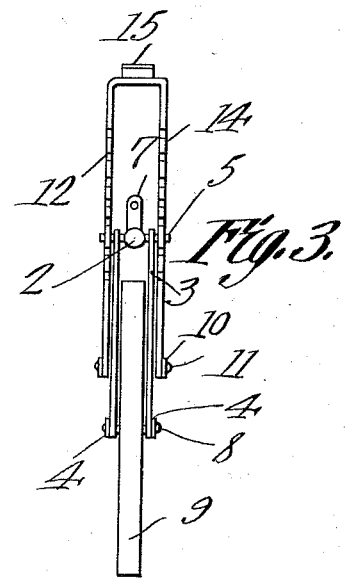
Witnesses
G. L. Chitwood,
Inventor
by
Attorneys

UNITED STATES PATENT OFFICE.

GEORGE L. CHITWOOD, OF CONWAY SPRINGS, KANSAS.

WAGON-JACK.

1,078,610.   Specification of Letters Patent.   Patented Nov. 18, 1913.

Application filed March 14, 1913. Serial No. 754,319.

*To all whom it may concern:*

Be it known that I, GEORGE L. CHITWOOD, a citizen of the United States, residing at Conway Springs, in the county of Sumner and State of Kansas, have invented a new and useful Wagon-Jack, of which the following is a specification.

The device forming the subject matter of this application is a wagon jack, and one object of the present invention is to provide a wagon jack which may readily be moved about from place to place as occasion may demand.

Another object of the invention is to provide a wagon jack having a novel means for elevating the vehicle supporting standard.

It is within the scope of the invention to improve generally and to enhance the utility of, devices of that type to which the present invention appertains.

With the above and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing:—Figure 1 shows the invention in side elevation, in the position which it will assume while supporting a vehicle axle; Fig. 2 is a side elevation showing the axle supporting standard swung back; and Fig. 3 is an end elevation.

In carrying out the invention there is provided a frame which is denoted generally by the numeral 1. The frame 1 comprises a lever 2, uprights 3 and braces 4. A pin 5 extends through the forward end of the lever 2 and constitutes a mounting for the uprights 3. A securing element 6 which may be a bolt and nut structure, unites the rear ends of the braces 4 with the lever 2. A shaft 8 connects the lower ends of the uprights 3 with the lower, forward ends of the braces 4. Secured to the upper face of the lever 2 adjacent its forward edge is an angular lifting foot 7.

Journaled for rotation on the shaft 8 is a wheel 9, constituting a support. The rear ends of links 10 are pivotally mounted on the securing element 6 and by means of securing elements 11, the forward, lower ends of the links 10 are pivotally assembled with the lower ends of a U-shaped standard 12. In the forward edges of the standard 12 are pairs of notches, the notches of any one pair being adapted to engage with the pin 5. The notches are indicated at 14. Mounted upon the upper end of the standard 12 is a saddle 15 which serves to receive the vehicle axle.

In practical operation, the jack may be moved to the desired location, the lever 2 acting as a tongue and the wheel 9 constituting a support upon which the jack may readily be trundled along. The standard 12 is then disconnected from the pin 5, as shown in Fig. 2, and the appropriate pair of notches 14 are engaged with the pin 5 so that the saddle 15 may be disposed relatively near to the lower edge of the vehicle axle. The lever 2 is then swung forwardly and upwardly from the position shown in Fig. 2, and the saddle 15 is disposed beneath the axle. Then, if the lever 2 be swung downwardly and rearwardly into contact with the ground, the standard 12 will be elevated, effecting a lifting of the axle.

A three point support for the axle is provided, the three points of the support comprising the ground engaging end of the lever 2, the point at which the wheel 9 engages the ground, and the pin 5.

The angular foot 7 may be employed for lifting a vehicle axle or other heavy object which is spaced from the ground by a distance less than the diameter of the wheel 9.

Having thus described the invention, what is claimed is:—

1. A wagon jack comprising a support; a frame pivoted to the support; a standard engaged intermediate its ends with the support; and a link connecting the lower end of the standard with the frame.

2. A wagon jack comprising a support; a frame pivoted to the support; a standard; a link connecting the lower end of the standard with the frame; and interengaging elements upon the standard and the frame to provide for a vertical, step-by-step adjustment of the standard.

3. A wagon jack comprising a frame; a wheel journaled for rotation in the frame and located at one end of the frame; a standard; interengaging elements upon the standard and the frame; and a link connecting the lower end of the standard with the frame.

4. A wagon jack comprising a lever; an upright located adjacent one end of the lever; a wheel journaled at the lower end of the upright; a projection outstanding from the lever adjacent the point of juncture between the upright and the lever; a standard having means for engaging the projection; and means for connecting the standard with the lever.

5. A wagon jack comprising a lever; an upright located adjacent one end of the lever; a pin connecting the upright with the lever; a brace; a securing element connecting the brace with the lever; a shaft connecting the brace with the upright; a wheel journaled for rotation on the shaft; a link pivotally mounted upon the securing element; a standard pivoted to the link; and means upon the standard for engagement, adjustably, with the pin.

6. A wagon jack comprising a frame; a wheel journaled on one end of the frame; a standard having step-by-step means for engagement with the frame; and means for pivotally connecting the standard with the frame.

In testimony that I claim the foregoing as my own, I have hereto affixed my signature in the presence of two witnesses.

GEORGE L. CHITWOOD.

Witnesses:
W. C. EVANS,
H. T. SHOBE.

Copies of this patent may be obtained for five cents each, by addressing the "Commissioner of Patents, Washington, D. C."